No. 655,397. Patented Aug. 7, 1900.
J. T. FITZGERALD & J. S. RAMSEY.
SEEDER.
(Application filed Sept. 23, 1899.)
(No Model.)
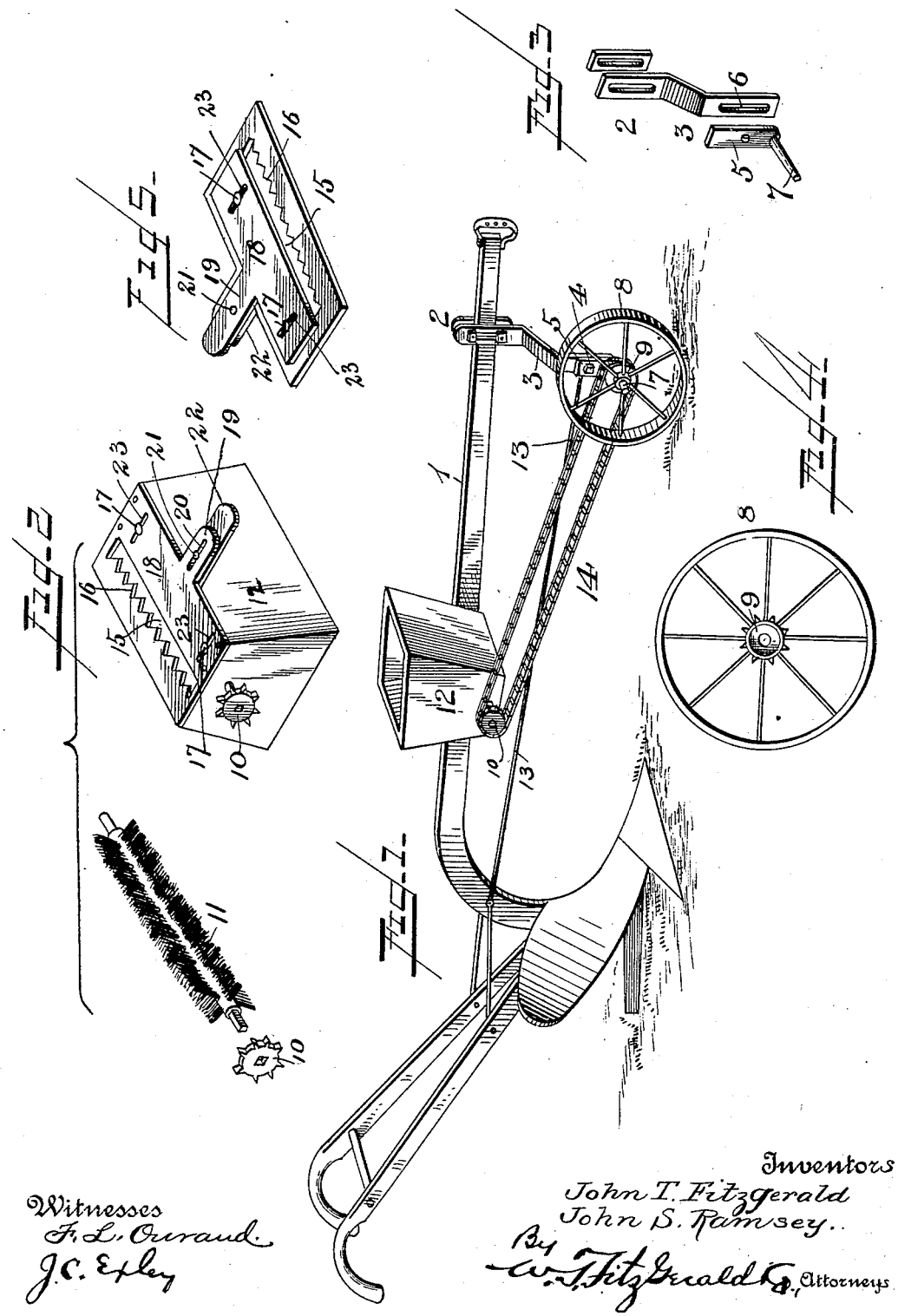
Witnesses
F. L. Ouraud
J. C. Exley
Inventors
John T. Fitzgerald
John S. Ramsey
By W. T. Fitzgerald, Attorneys
THE NORRIS PETERS CO., PHOTO-LITHO., WASHINGTON, D. C.

UNITED STATES PATENT OFFICE.

JOHN THORNTON FITZGERALD AND JOHN SHELTON RAMSEY, OF BELLS, TEXAS.

SEEDER.

SPECIFICATION forming part of Letters Patent No. 655,397, dated August 7, 1900.

Application filed September 23, 1899. Serial No. 731,475. (No model.)

*To all whom it may concern:*

Be it known that we, JOHN THORNTON FITZGERALD and JOHN SHELTON RAMSEY, citizens of the United States, and residents of Bells, in the county of Grayson and State of Texas, have invented a new and useful Machine for Sowing Small Grain, of which the following a specification.

Our invention relates to seeding-machines, and while it will be found desirable and useful for all of the purposes for which a seeding apparatus is useful, yet it will be found especially desirable for being used in connection with a plow, whereby the seed may be deposited any desired depth in the soil.

One object of our invention is to enable the seed to be uniformly distributed in rows in advance of the plowshare, thereby enabling the seed thus deposited to be immediately covered by the plow.

A further object is to so dispose the seeding apparatus that it will be close to the surface of the soil, and the seed when small will therefore not be liable to be effected by the wind.

Other objects and advantages will be made fully apparent from the following specification considered in connection with the accompanying drawings, in which—

Figure 1 is a perspective view of our invention complete applied to use upon a plow-beam. Fig. 2 is a perspective view of the hopper, showing the same inverted and illustrating the means employed to provide a slot of varying size. Said view also illustrates a perspective detail of the agitating-brush disposed within the hopper. Fig. 3 illustrates in detail the means employed to secure the driving-wheel to the beam of the plow. Fig. 4 is a detail view of the driving-wheel. Fig. 5 is a perspective view of the bottom of the hopper removed.

In order to conveniently designate the several parts, numerals will be employed, of which 1 indicates the beam of a plow of the usual or any preferred construction, to the forward part of which we secure by suitable bolts the clamp 2, having the downward extension 3, provided with securing-bolts 4, by means of which we secure to said downward extension the upper end of the wheel-carrying bracket 5, said upper end being provided with a slotted aperture 6, designed to receive the bolts 4, by means of which the parts may be adjustably secured together. The lower end of the bracket is provided with the axle or journal 7, designed to receive the hub of the driving-wheel 8, the outer end of the hub being provided with a sprocket-wheel 9, designed to coöperate with the sprocket-wheel 10 upon the outer end of the rotating brush 11 by means of a sprocket-chain 14, said brush being properly mounted in the hopper 12 for a purpose hereinafter set forth. The downward extension 3 is provided with the rod 13, which extends backward to the handles or other convenient part of the frame and is designed to direct weeds and other trash, so that the same will be covered by the plow.

The sprockets 9 and 10 are properly connected by a sprocket-chain 14, by means of which the rotatable brush 11 is actuated. The brush 11 is located in the hopper 12 immediately above the slot 15, one edge of the slot being formed by the serrations 16, as clearly shown in Fig. 2. In order to provide that the slot may be of adjustable capacity or extent, we secure to the bottom of the hopper, as by the bolts 17, the movable plate or lip 18, which is provided at its central part with an outwardly-extending handle 19, having the slot 20, by means of which and the set-screw 21 and the plate or lip 18 is adjustably held in place. The bottom of the box is provided at a central part with the rearwardly-extending plate 22, through which the set-screw 21 is adapted to pass, and it is therefore obvious that since the bolts 17 play loosely in the slots 23 the plate 18 may be readily adjusted by properly manipulating the set-screw 21. It is therefore obvious that the slot 15 may be increased or diminished in extent by a proper adjustment of the plate 18.

By providing that the stationary edge of the slot 15 shall be serrated or regularly notched we are able to distribute very small seed, inasmuch as the plate 18 may be so adjusted that its edge will contact with the points of the serrations 16, and thus leave a series of very small apertures through which the seed may escape. It is further obvious that the slot may be very greatly increased in extent by loosening the set-screw 21 and withdrawing the plate 18 from the serrations, thereby providing a slot of greater or less width as may be required for coöperating with seeds of various varieties and sizes.

By locating the brush 11 directly over the slot 15 it is clear that the contents of the hopper 12 may be agitated and that the slot will be prevented from becoming clogged by any trash or particles of seed-hulls or the like which may become casually mixed with the seed.

By reference to the foregoing specification and the accompanying drawings it will be seen that we have provided a simple, cheap, and efficient means for sowing almost any variety of seed, inasmuch as the serrations 16 will enable us to sow very small seed, while the adjustability of the plate 18 will make it possible to sow seed of larger size.

Believing that the advantages and use of our improved seeder will be made fully apparent from the foregoing specification, further reference to the details is deemed unnecessary.

Having thus fully described our invention, what we claim as new, and desire to secure by Letters Patent, is—

1. The herein-described seeder comprising an adjustable wheel-carrying bracket, and a sprocket carried by said wheel, in combination with a hopper having a longitudinal slot in its bottom, one edge of said slot being serrated, whereby the teeth 16 will be provided; a movable plate having the slots 20 and 23 secured to the bottom of said hopper and provided with the extension 19; an extension 22 formed upon the bottom of the hopper and provided with a set-screw 21 adapted to extend through the slot 20 whereby the plate 18 may be adjustably secured in any desired position all substantially as specified and for the purpose set forth.

2. In seeders, the herein-described hopper having a slot in its bottom one edge of said slot being serrated or provided with a series of points, the bottom of the hopper being provided with the central rear extension 22, in combination with an adjustable plate having the slots 20 and 23 and a central extension 19 designed to coöperate with the extension 22; bolts 17 coöperating with the slots 23 and a set-screw 21 coöperating with the slot 20, whereby the plate 18 may be readily secured in an adjusted position and the slot increased or diminished in extent substantially as specified and for the purpose set forth.

In testimony whereof we have signed our names to this specification in the presence of two subscribing witnesses.

JOHN THORNTON FITZGERALD.
JOHN SHELTON RAMSEY.

Witnesses:
S. E. BODGETT,
J. C. MILCHER.